United States Patent [19]

Thompson

[11] 4,236,680

[45] Dec. 2, 1980

[54] TAKE-UP REEL

[75] Inventor: John U. Thompson, Arlington Heights, Ill.

[73] Assignee: Oce'-Industries, Inc., Chicago, Ill.

[21] Appl. No.: 743,646

[22] Filed: Nov. 22, 1976

[51] Int. Cl.³ .............................................. B65H 75/28
[52] U.S. Cl. .................................. 242/74.1; 242/195; 242/210
[58] Field of Search ..................... 242/210, 195, 71.8, 242/74, 74.1, 74.2

[56] References Cited

U.S. PATENT DOCUMENTS

| | | | |
|---|---|---|---|
| 1,578,231 | 3/1926 | Deses et al. | 242/74.1 |
| 2,390,894 | 12/1945 | Morse | 242/74.1 |
| 3,161,370 | 12/1964 | Schwartz | 242/74 |
| 3,243,136 | 3/1966 | Bloom | 242/71.8 |
| 3,393,790 | 7/1968 | Dixon | 242/71.8 X |

FOREIGN PATENT DOCUMENTS 252860 2/1970 U.S.S.R. .................................. 242/74

Primary Examiner—George F. Mautz
Attorney, Agent, or Firm—Richard A. Zachar

[57] ABSTRACT

A slip-lock type take-up reel for roll film has drive and driven flanges provided with axial cores that allow limited relative rotary movement of the flanges between a slip position where the cores are radially spaced to receive or release a film end and a lock position where the film end is gripped in interference fit between the cores.

6 Claims, 3 Drawing Figures

TAKE-UP REEL

BACKGROUND OF THE INVENTION

This invention relates to take-up reels for roll film and the like and, more particularly, it is concerned with take-up reels for use in roll-type microfilm projection equipment, such as readers and reader-printers. In the case of microfilm readers and reader-printers, certain of the lines of equipment utilize roll film having special leaders for cooperation with specialized take-up reel designs. Generally, the mating features of these reels and film leaders are customized by each manufacturer are intended to facilitate threading and minimize transfer time when switching between reels. In many instances a current user already has a library containing numerous different types of roll film and leaders, each being intended to function with a special mating take-up reel design.

There is a need for a universal take-up reel which is compatible with the various different leaders on the existing roll films in current libraries. In addition it is desirable that any such universal take-up reel offer the feature of convenient threading and release for simplifying the loading and unloading of each reel to be scanned.

SUMMARY OF THE INVENTION

The present invention provides an improved take-up reel that utilizes a slip-lock type rotary interference fit to accomodate simple insertion and withdrawal of a roll film strip end. The slip-lock type interference fit is readily arranged to cooperate with leaders of various configurations to provide a universal take-up reel.

More particularly, the slip-lock type take-up reel of this invention comprises a drive flange having an axial core defining a drive socket, a driven flange having am axial core surrounding the first core to serve as a spool and interengaging means guiding the flanges for relative rotary movement about an axis of the socket, the reel being characterized in that the driven flange core has a feed passage for a film end of a roll film that is to be wound upon the spool in an annular space defined between the flanges, and the drive flange core has cam means eccentric to the axis to move relative to the driven flange, in response to rotation of the drive flange in a film take-up direction, between a slip position radially spaced from the driven flange core for allowing movement of the film end through the passage and a lock position radially adjacent the driven flange core for gripping the film end between the cores in interference fit relation and thereby lock the flanges for joint rotary movement during film take-up and rewind.

To provide a universal reel of simplified arrangement, one of the reel flanges has a wall slot opening thru its outer periphery and intersecting the feed passage to enable edgewise insertion of the film end or leader between the cores in the slip position. Preferably, the wall slot is in the driven flange and extends along a line generally tangent to the driven flange core.

To enhance the rotary slip-lock feature the driven flange core preferably has a portion adjacent the feed passage that is accentric relative to the axis of the socket to provide a variable interference fit for the cam and thus facilitate gripping a range of film leader configurations.

In accordance with further features of the invention, the angular range of rotary slip between the flanges is limited by cooperating lug and slot configurations and the relative rotary movement between the flanges is guided by a stepped diameter end portion on the drive flange core that is journalled in a circular central opening in the driven flange.

Other features and advantages of the invention will be apparent from the following description and claims, and are illustrated in the accompanying drawings which show structure embodying preferred features of the present invention and the principles thereof, and what is now considered to be the best mode in which to apply these principles.

DESCRIPTION OF THE PREFERRED EMBODIMENT

Figure 1:
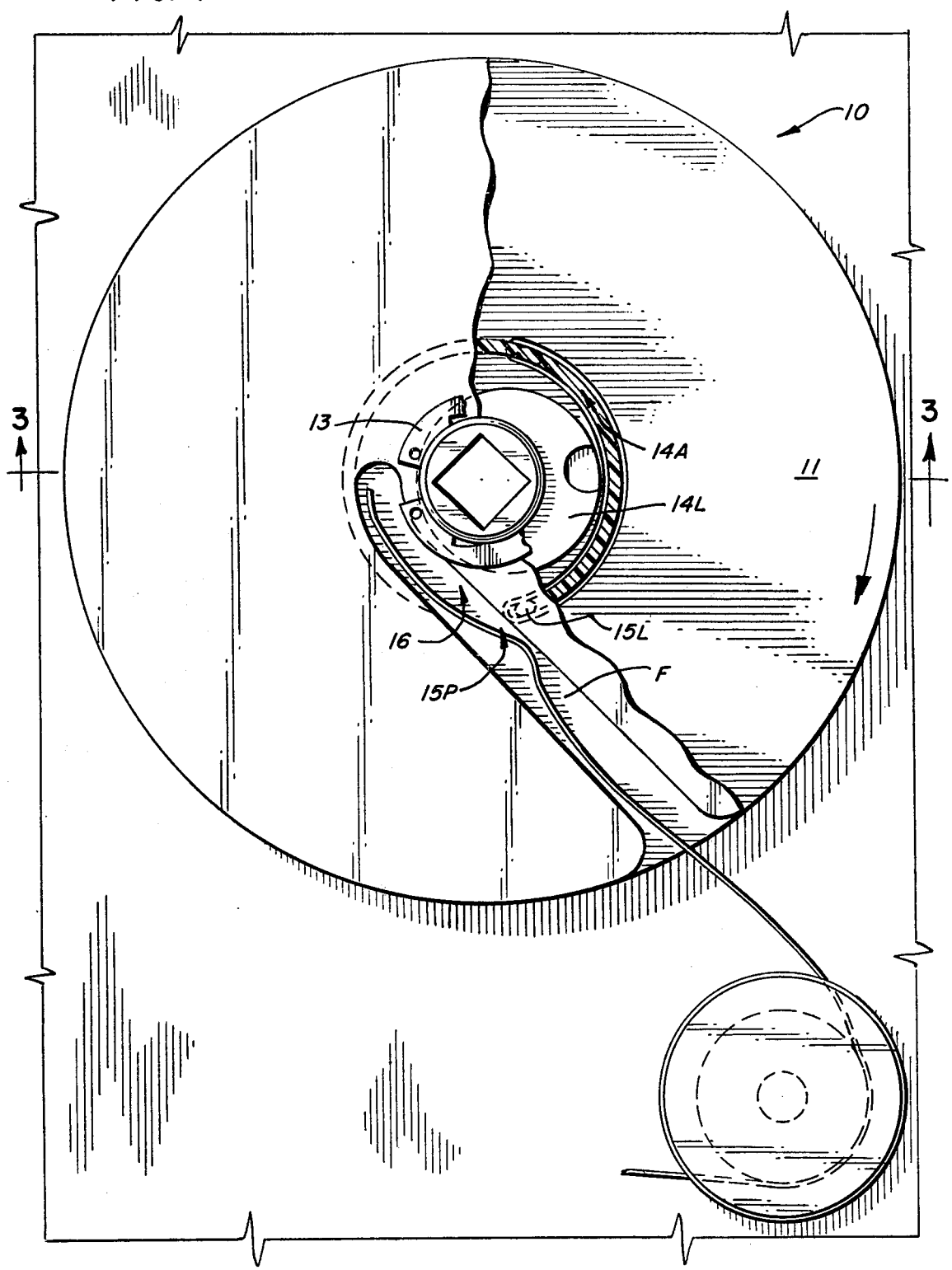
FIG. 1 is a plan view with parts broken away and sectioned illustrating the take-up reel in its slip position for threading a film strip end.

Referring now to the drawings, the take-up reel 10 as shown for use with roll-type microfilm, comprises a base flange 11 which is to be engaged and driven by the output shaft of a film drive system (not shown) and an upper driven flange 12 which is secured in co-axial relation upon the drive flange by means including a conventional retaining ring 13. The flanges 11, 12 are of corresponding diameter and cooperably define an annular space A within which the roll film is wound.

In accordance with this invention, novel interacting core arrangements are provided on the part of flanges to facilitate threading and release of a film strip end F and particularly to enable a single take-up reel arrangement to be compatible with the variety of different leaders that are employed on present day roll film by the various manufacturers. The leaders differ in width, thickness and in edge configuration such that users with extensive film libraries may have leaders of various different designs, Universal compatibility with these leaders is an important requirement for a general purpose take-up reel in modern day microfilm equipment.

In the preferred embodiment illustrated herein, the base or drive flange 11 is shown with an upwardly extending axial core structure 14 that defines a drive socket 14S for engagement with an upwardly projecting film drive output shaft (not shown). Correspondingly, the driven flange 12 has a tubular vertically depending axial core 15 surrounding the drive flange core to serve as a winding spool for the roll film that is stored in the annular space A. The flanges, when assembled, have interengaging means that guide the flanges for relative rotary movement about the axis of the socket 14S, such interengaging means here being shown as a stepped diameter portion 14D provided at the upper end of the drive core to project through a central axial opening in the top driven flange 12 to journal the parts in accurately guided co-axial relation.

The take-up reel of this invention exhibits an automatic slip-lock action in response to limited relative rotation between the flanges 11, 12. In the illustrated embodiment, constraint of such limited rotation is provided by means of an arcuate slot 14A provided in the drive flange in alignment with a depending bottom lug portion 15L that is formed integrally on the driven flange core 15. The arcuate slot 14A subtends an angle of almost 180° and the lug 15L is moveable in the slot to enable relative rotary movement of the flanges 11, 12 between a slip position as shown in FIG. 1 wherein the lug 15L is adjacent one end of the slot 14A and a lock position wherein the lug 15L approaches the other end of the slot depending upon the characteristics of the film strip end F which is being gripped.

Figure 2:
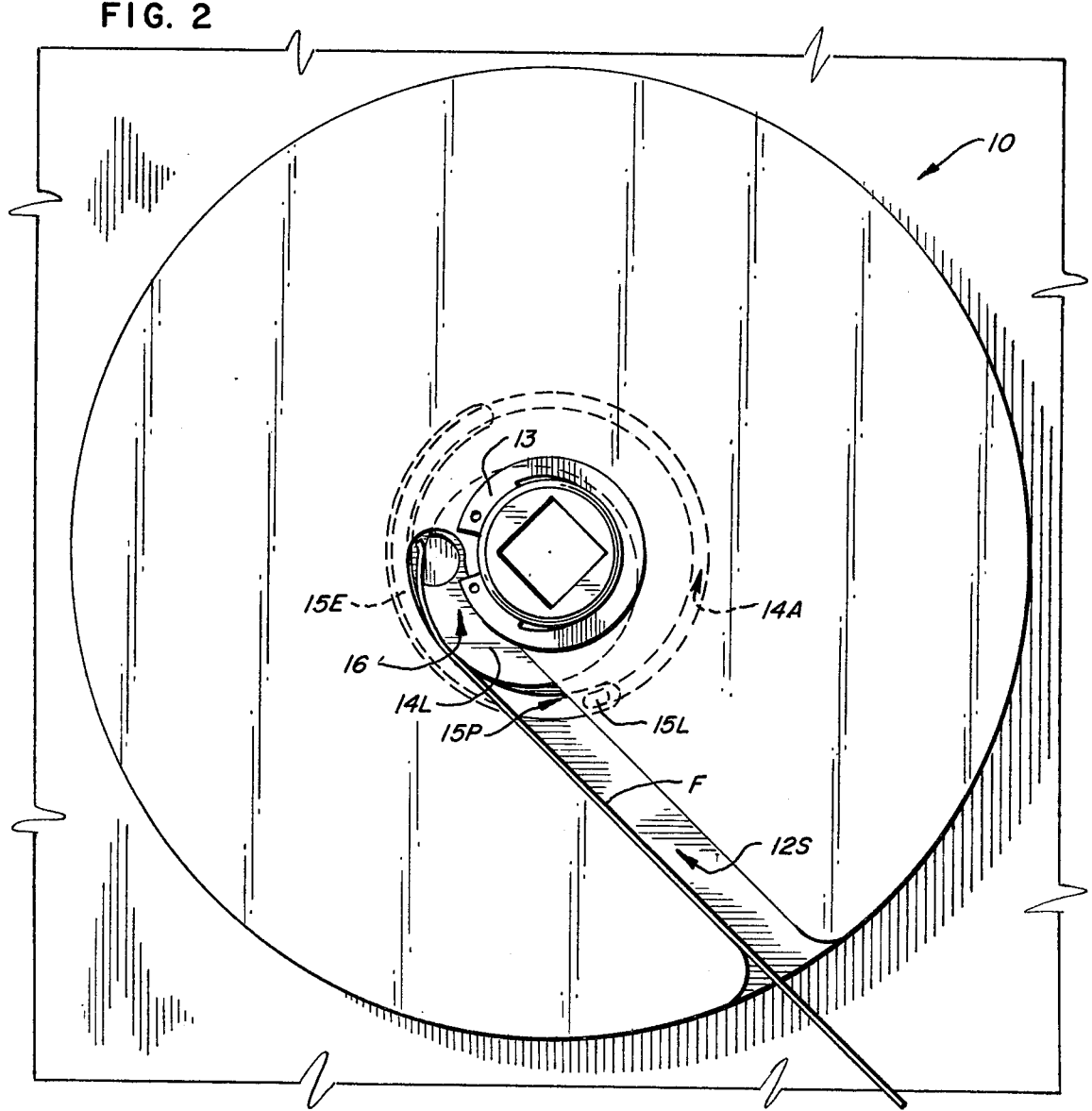
FIG. 2 is a corresponding plan view illustrating the take-up reel in its lock position.
Figure 3:
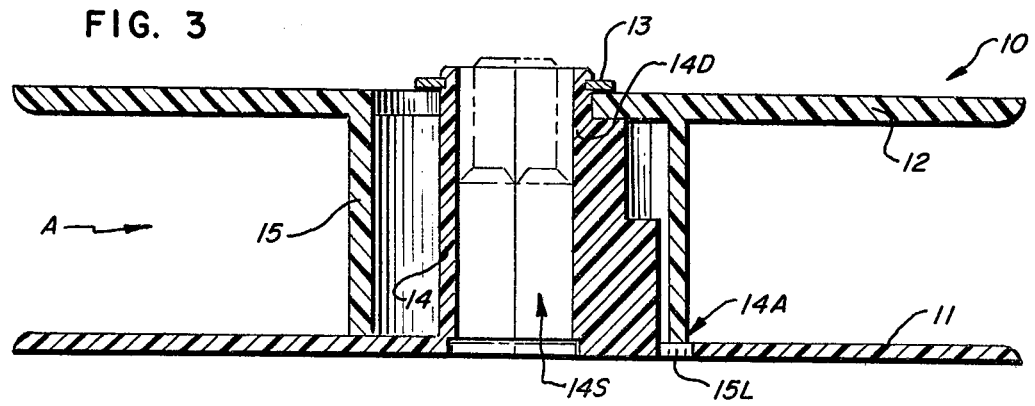
FIG. 3 is a transverse sectional view taken as indicated on the line 3—3 of FIG. 1.

The slip lock action is developed by the limited rotary movement permitted between the drive flange core 14 and the driven flange core 15 which are arranged to grip the film strip end F in interference fit relation when the cores are in the lock position as shown in FIG. 2. The driven flange core 15 is shown with a feed passage 15P for loading the film strip end into position between the cores, the feed passage 15P merely being a wall opening in the core wall to accommodate insertion and withdrawal of the film strip end. Thus, the feed passage communicates between the intercore region 16 and the annular space A where the film is wound upon the spool.

In the preferred embodiment, the drive flange core 14 has a lobe portion 14L to function as a cam means eccentric to the axis of the socket 14S. In the slip position of FIG. 1, the high region of the cam lobe is remote from the feed passage and the film strip end is, then, freely moveable. In the lock position, the high region of the cam lobe moves clockwise as viewed in FIG. 2 to traverse the feed passage 15P and engage the film strip end adjacent the portion of the driven flange core which is designated at 15E for gripping the film end in interference fit between the cores. Upon continued clockwise movement beyond the FIG. 2 position, the flanges undergo joint rotary movement during film take-up to wind the film upon the spool in the usual fashion. During rewind, the flanges move in unison until the roll film is unwound from the spool and the cam lobe 14L then moves beyond the feed passage from the FIG. 2 position to the FIG. 1 position to release the film strip end for automatic withdrawal in response to continued rotation of the drive flange 11.

To afford maximum convenience and universal compatability, the driven flange 12 is provided with a wall slot 12S that is open to its outer periphery. The wall slot 12S intersects the feed passage to enable edgwise insertion of the film end between the cores when the cores are in the slip position shown in FIG. 1. The wall slot 12S is preferably directed generally tangent to the adjacent portion of the driven flange core against which the film strip end is to be gripped by the cam lobe. As a further feature of particular utility for compatibility with leaders of a range of thicknesses the driven flange core portion 15E adjoining the feed passage 15P is of progressively increasing thickness as it extends away from the feed passage to define an eccentric profile relative to the axis of the socket and provide a variable interference fit. Thus, with a relatively thick film strip end the cam lobe 14L will engage in interference fit locking engagement shortly after passing the feed passage while for a thin film strip end, additional clockwise travel along the eccentric wall portion 15E will occur before interference fit engagement.

Thus, while preferred constructional features of the invention are embodied in the structure illustrated herein, it is to be understood that changes and variations may be made by those skilled in the art without department from the spirit and scope of the appended claims.

What is claimed is:

1. A slip-lock take-up reel for roll film and the like comprising a drive flange having an axial core defining a drive socket, a driven flange having an axial core surrounding the first core to serve as a spool and interengaging means guiding the flanges for relative rotary movement about an axis of the socket, the reel being characterized in that the driven flange core has a feed passage for a film end of a roll film that is to be wound upon the spool in an annular space defined between the flanges, and the drive flange core has drive cam means eccentric to the axis to undergo rotary movement relative to the driven flange between a slip position wherein the drive cam means presents a relieved portion thereof in radially spaced relation to the feed passage region of the driven flange core for allowing movement of the film end through the feed passage and a lock position wherein the drive cam means presents a raised portion thereof radially adjacent a circumferentially spaced region of the driven flange core, said reel in response to rotation of the drive flange in a film take-up direction acting to grip the film end between the cores in interference fit relation and thereby lock the flanges for joint rotary movement during the film take-up mode and the rewind mode.

2. A take-up reel as defined in claim 1 and wherein one of said flanges has a wall slot opening through its outer periphery and intersecting the feed passage to enable edgewise insertion of the film end between the cores when the cores are in the slip position.

3. A take-up reel as defined in claim 2 wherein the driven flange incorporates the wall slot, with the wall slot extending beyond the passage to be tangent to the adjacent portion of the driven flange core.

4. A take-up reel as defined in claim 1 wherein the driven flange core has a portion adjacent the feed passage that is eccentric relative to the axis of the socket to provide a variable interference fit relative to the cam means capable of gripping a range of film end thicknesses.

5. A take-up reel as defined in claim 1 wherein the drive flange has an arcuate slot radially outward of the drive flange core and the driven flange core has an axial lug portion projecting into the arcuate slot for defining limited relative rotation between the flanges.

6. A take-up reel as defined in claim 1 wherein the driven flange has a circular central opening and the drive flange core has a stepped diameter end portion journalled in the central opening to constitute the means for guiding the flanges for relative rotation about the axis.

* * * * *